United States Patent
Yoshida et al.

(10) Patent No.: US 6,826,693 B1
(45) Date of Patent: Nov. 30, 2004

(54) INFORMATION TRANSMISSION APPARATUS

(75) Inventors: Toshiko Yoshida, Kyoto (JP); Toshimi Kiyohara, Kyoto (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 09/392,826

(22) Filed: Sep. 9, 1999

(30) Foreign Application Priority Data

Sep. 9, 1998 (JP) .......................................... 10-255652

(51) Int. Cl.[7] .............................................. H04L 9/00
(52) U.S. Cl. ...................................... 713/201; 725/46
(58) Field of Search ................................. 713/150, 200, 713/201; 709/319, 224; 725/46

(56) References Cited

U.S. PATENT DOCUMENTS

| | | | |
|---|---|---|---|
| 5,664,100 A | * | 9/1997 | Miura ......................... 709/232 |
| 5,778,367 A | * | 7/1998 | Wesinger, Jr. et al. ........ 707/10 |
| 5,926,816 A | * | 7/1999 | Bauer et al. .................... 707/8 |

FOREIGN PATENT DOCUMENTS

| | | |
|---|---|---|
| JP | 9-74389 | 3/1997 |
| JP | 9-148994 | 6/1997 |
| JP | 9-190373 | 7/1997 |

* cited by examiner

*Primary Examiner*—Kim Vu
*Assistant Examiner*—Thanhnga Truong
(74) *Attorney, Agent, or Firm*—Edwards & Angell, LLP; David G. Conlin; George N. Chaclas

(57) ABSTRACT

When an information access request is made from a terminal for personal use via a computer network, a terminal information receiving section of an information transmission apparatus extracts terminal information contained in the request. A personal information collating section extracts personal information relevant to that person from personal information accumulated in a database. The information relevant to that person is collected from the database of an information server section and the like. The collected information is edited in an information editing section into contents suited to the terminal.

18 Claims, 10 Drawing Sheets

FIG. 6

NEWS FOR PORTABLE TERMINAL 36

- △△ STARTS NEW PROJECT ××.
- ○○ BILL WAS PASSED.
- PLAYER ●● WON AT ◎◎ MEET.
- TOMORROW WEATHER : RAINY

NEWS FOR PERSONAL COMPUTER 37

- △△ CORPORATION (CAPITAL: n HUNDREDS MILLIONS, REPRESENTATIVE: MR.☆☆) CONDUCTING ★★ AS MAIN BUSINESS HAS STARTED NEW PROJECT ××. THIS PROJECT IS THE FIRST TRIAL IN THE COUNTRY.

- ○○ BILL WAS PASSED UNANIMOUSLY IN THE ORDINARY SESSION OF DIET ON mTH DAY OF nTH MONTH. IN RESPONSE TO THIS, VARIOUS RELATED DEPARTMENTS OF SOCIETY BEGAN WORKING FOR FULL-SCALE COUNTERPLAN.

- IN ◎◎ MEET HELD IN ▲▲ STADIUM, PLAYER ●● WON ON mth DAY OF nTH MONTH. RECORD WAS hh: mm: ss.

- TOMORROW, IN KINKI AREA, IT WILL RAIN AND OCCASIONALLY BE CLOUDY. THE RAINFALL PROBABILITY IS 70 %.

FIG. 7

| PERSONAL ID | KEYWORD |
|---|---|
| 123456 | X DIVISION, SOCCER CLUB |

~25

+

KEYWORD EXTRACTED FROM CONTENTS READ: ~40
SOCCER, RUGBY FOOTBALL

=

| PERSONAL ID | KEYWORD |
|---|---|
| 123456 | SOCCER CLUB, X DIVISION, RUGBY FOOTBALL |

| BELONGING | URL |
|---|---|
| X DIVISION SOCCER CLUB | http://dept.hogera.co.jp/X/ http://club.hogera.co.jp/soccer/ |

70

INFORMATION TRANSMISSION APPARATUS

BACKGROUND OF THE INVENTION

1. Field of the Invention

The present invention relates to an information transmission apparatus which is connected to a terminal apparatus for personal use via a communication network, for editing information intended for a person on the basis of terminal information and transmitting the information to the terminal apparatus.

2. Description of the Related Art

Prior arts relating to an information transmission apparatus which searches for a database in accordance with a request sent from a terminal via a communication network and transmits the searched information to the terminal are disclosed in Japanese Unexamined Patent Publications JP-A 9-148994(1997), JP-A 9-74389(1997) and JP-A 9-190373 (1997), for example.

JP-A 9-148994 proposes a system in which, when link data displayed using HTML (Hyper Text Markup Language) and the like is included in the transmitted data, the end of the link is changed in accordance with the user and information suited to the recipient is transmitted. JP-A 9-74389 proposes a data broadcast reception system which makes a selection by comparing the data received by the receiving terminal with personal information. JP-A 9-190373 proposes an information perusal processing apparatus which collates an identification number inputted from a client terminal in a selective operation processing routine of a server to select whether or not secure data is to be transmitted.

In the technology proposed in JP-A 9-148994, because the document is partially replaced in accordance with the personal information of the user, the information transmission can be performed rapidly via the initial information communication network. However, since the user cannot actually access the information for the person unless the link is traced, in the case of a terminal which is not usually connected to the computer network, the terminal cannot establish a connection until the link is traced, which brings a problem that the communication cost rises.

The prior art disclosed in JP-A 9-74389 is effective in the case where the same amount of information must be distributed regardless of the number of receiving terminals, the case such as broadcasting. However, in the case where data is distributed via a wired communication network, the amount of information under transmission which is to arrive at the receiving terminals is large, causing a throng on the information communication band. Therefore, the information distribution cannot be performed efficiently. In order to perform the information distribution efficiently, it is necessary to trim the information on the transmitting side as well.

The prior art disclosed in JP-A 9-190373 merely provides an arrangement for determining whether or not to transmit information accumulated in a server to a user requesting access in accordance with the privacy level of the information, and does not disclose automatic manipulation of information in conformance with the user.

SUMMARY OF THE INVENTION

An object of the invention is to provide an information transmission apparatus which is capable of transmitting information adapted for the terminal and the person in response to an information access request from a terminal.

The invention provides an information transmission apparatus for transmitting information in response to an information access request from a terminal apparatus connected via a communication network, the information transmission apparatus comprising:

a terminal information receiving section for analyzing an information access request sent from a terminal apparatus and received via a communication network and extracting terminal information in the request;

a personal information collating section accumulating personal information, for extracting personal information for a person corresponding to the terminal information received by the terminal information receiving section, from the accumulated personal information by collation with the terminal information as a key;

an information server section accumulating accessible information as a database, for fetching and collecting information corresponding to the access request from the database in accordance with the personal information extracted by the personal information collating section;

an information editing section for editing the information collected by the information server section on the basis of the personal information extracted by the personal information collating section and the terminal information received by the terminal information receiving section; and an information transmission section for transmitting the information edited by the information editing section to the terminal apparatus sending the information access request.

According to the invention, an information access request sent from a terminal apparatus via a communication network is received by the terminal information receiving section and analyzed. The terminal information received by the terminal receiving section is used as a key for collation of personal information accumulated in the personal information collating section in order to extract personal information for a person corresponding to the terminal information therefrom. The server section, which accumulates accessible information as a database, fetches and collects information from the database in accordance with the personal information extracted by the personal information collating section. The information editing section edits the information collected by the information server section on the basis of the personal information extracted by the personal information collating section and the terminal information received by the terminal information receiving section. The information transmission section transmits the information edited by the information editing section to the terminal apparatus sending the information access request. Since the information collected in accordance with the personal information and edited in accordance with the terminal information is transmitted to the terminal apparatus sending the information access request, the information requested by the terminal apparatus can be received by the terminal apparatus in the form having been edited to adapt to the terminal apparatus. When the terminal apparatus is a portable terminal, or when the display unit or the capacity of memory is small, the information is transmitted after narrowing down the information, so that it is possible to provide the user with necessary information without causing a throng to the network resources.

In the invention it is preferable that the information transmission apparatus further comprises an access monitoring section for monitoring information communication from the reception of the information access request from the terminal apparatus until the transmission of the information, and storing a history of information access in the personal information collating section in relation to the terminal apparatus, and the personal information collating section reflects the history of information access to the extracted personal information.

According to the invention, the access monitoring section monitors the information communication from reception of the information access request from the terminal apparatus until transmission of the information and stores the history of the information access in the personal information collating section in relation to the terminal apparatus. The personal information collating section reflects the history of information access to the extracted personal information. Therefore, the user of the terminal apparatus is able to view with a greater degree of preference information of the type the user normally prefers to read as the frequency of use increases. Thus, the labor involved in finding preferred information is reduced.

Moreover, in the invention it is preferable that the information editing section collects and edits information to be transmitted in advance before an information access request is received from the terminal apparatus, and when information conforming to the personal information extracted by the personal information collating section and the terminal information received by the terminal information receiving section is edited by the information editing section at the time of reception of the information access request, the information transmission section transmits the edited information to the terminal apparatus.

According to the invention, the information editing section edits information to be transmitted before an information access request is received from the terminal apparatus is collected and edited in advance by the information editing section. And the information transmission section transmits the edited information to the terminal apparatus in the case where the personal information extracted by the personal information collating section and the terminal information received by the terminal information receiving section are already edited by the information editing section at the time of reception of the information access request from the terminal apparatus. Therefore, it is possible to reduce the length of time during which the terminal apparatus connects to the network from sending the information access request to receiving the information.

Moreover, in the invention it is preferable that a plurality of information server sections are provided so as to be distributed over the network, and one information server section serving as a main server collects information from other information server sections serving as sub servers.

According to the invention, a plurality of server sections are distributed over the network, and one information server section serving as a main information server section collects information from the other information server sections serving as sub information server sections. Therefore, there is no need to accumulate the information for all terminal apparatuses as a database in one information server section, and information can be transmitted to the terminal apparatus sending the information access request by collecting the information accumulated in other information server sections as databases.

Moreover, in the invention it is preferable that the plurality of information server sections have the same function, and each information server section serving as the sub server also can collect information from other information server sections, while regarding the other information server sections as its sub servers and referring to the terminal information and the personal information.

According to the invention, the plurality of information server sections have the same function, and each information server section serving as the sub server also can collect information from other information server sections, while regarding the other information server sections as its sub servers and referring to the terminal information and the personal information. Because the data accumulated in the plurality of information server sections as their own database can be collected to be transmitted to the terminal apparatus sending the information access request, it is possible to detect the load of collecting information of each server section.

According to the invention, the terminal apparatus sending the information access request receives the information optimized on the basis of the personal information and the terminal information, so that the information reader using the terminal apparatus can obtain necessary and sufficient amount of information without causing a throng to the network resources.

Further, according to the invention, collection and edition of the information are carried out with reference to the history indicating the information access requests that are made by the information reader, the user of the terminal apparatus, so that it is possible to readily obtain similar information related to those having been already read by the reader.

Further, according to the invention, when an information access request is received from the reader of the information or the like via a terminal apparatus, information prepared in advance can be transmitted, so that it is possible to reduce the time during which the terminal apparatus connects to the communication network and to shorten the waiting time required of the information reader using the terminal apparatus.

Moreover, according to the invention, it is not necessary for a main information server section to accumulate all the accessible information as a database thereof, and the database may be accumulated with being distributed to other sub information server sections, so that it is possible to reduce the memory required for accumulating the database of the main information server section and to readily give a room to the memory, which allows the most current information to be easily collected.

Further, according to the invention, because the plurality of information server sections each function as information collectors, the burden on the main information server is lightened, allowing efficient accumulation of the information by distributing the accumulation points.

BRIEF DESCRIPTION OF THE DRAWINGS

Other and further objects, features, and advantages of the invention will be more explicit from the following detailed description taken with reference to the drawings wherein:

FIG. 6 is a diagram showing another example of the editing in step s5 of FIG. 2;

FIG. 7 is a diagram showing a principle of reflecting a reading history of a user 20 who is a reader of the information, to the user information;

FIG. 10 is a diagram showing a principle of writing a storage location of the information in the other servers to a database of personal information 8 within a main server according to yet still another embodiment of the invention.

DETAILED DESCRIPTION OF THE PREFERRED EMBODIMENTS

Figure 1:
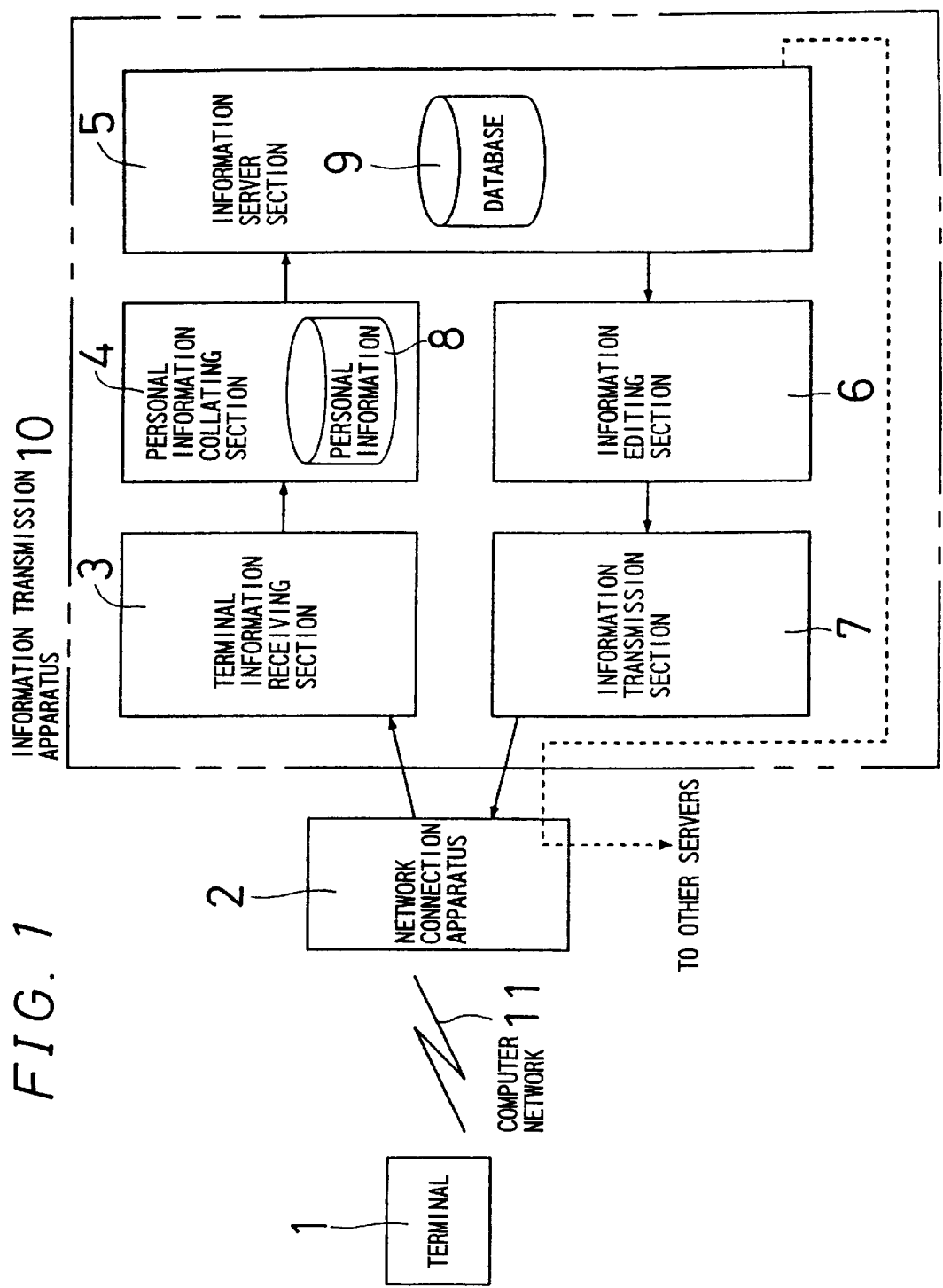
FIG. 1 is a block diagram schematically showing the system structure of an information transmission apparatus 10 as an embodiment of the invention.

Now referring to the drawings, preferred embodiments of the invention are described below.

FIG. 1 schematically shows the system structure of an information transmission apparatus as an embodiment of the invention. A terminal 1 is an information processing apparatus which requests information access and may be various types of apparatuses, such as a portable type information terminal generally called as a PDA (Personal Data Assistant), a portable or desktop type personal computer, and the like. Reception of information from the terminal 1 and transmission of information to the terminal 1 are performed in accordance with input and output of the information controlled by a network connection apparatus 2. The network connection apparatus 2 controls input and output of information between an information transmission apparatus 10 and a computer network 11 to which the terminal 1 is connected. The information transmission apparatus 10 includes a terminal information receiving section 3, a personal information collating section 4, an information server section 5, an information editing section 6, an information transmission section 7, personal information 8 accumulated in the personal information collating section 4, and a database 9 accumulated in the information server section 5. The computer network 11 connects the terminal 1 and the network connection apparatus 2 as a temporary communication network through a dedicated line or through a telephone line. Requests such as a request for information access sent from the terminal 1 are received from the computer network 11 by the terminal information receiving section 3 of the information transmission apparatus 10 via the network connection apparatus 2 and analysis of the information is performed. The terminal information receiving section 3 analyzes information such as received request and supplies terminal information to the personal information collating section 4.

The information collating section 4 accumulates the personal information 8, and performs collation of the accumulated information using the terminal information from the terminal information receiving section 3 as a key to extract personal information relating to the terminal information. Information accessible from the terminal 1 is accumulated in the information server section 5 as the database 9, and information to be sent is fetched and collected from the database 9 in accordance with the personal information extracted by the personal information collating section 4. The information editing section 6 edits the information collected by the information server section 5 in such a manner that the information is put into a suitable format according to the type of terminal which is obtained from the terminal information received by the terminal information receiving section 3 and to the personal information of the user of the terminal. The information transmission section 7 sends back the information edited by the information editing section 6 to the terminal 1 via the network connection apparatus 2 and the computer network 11.

Figure 2:
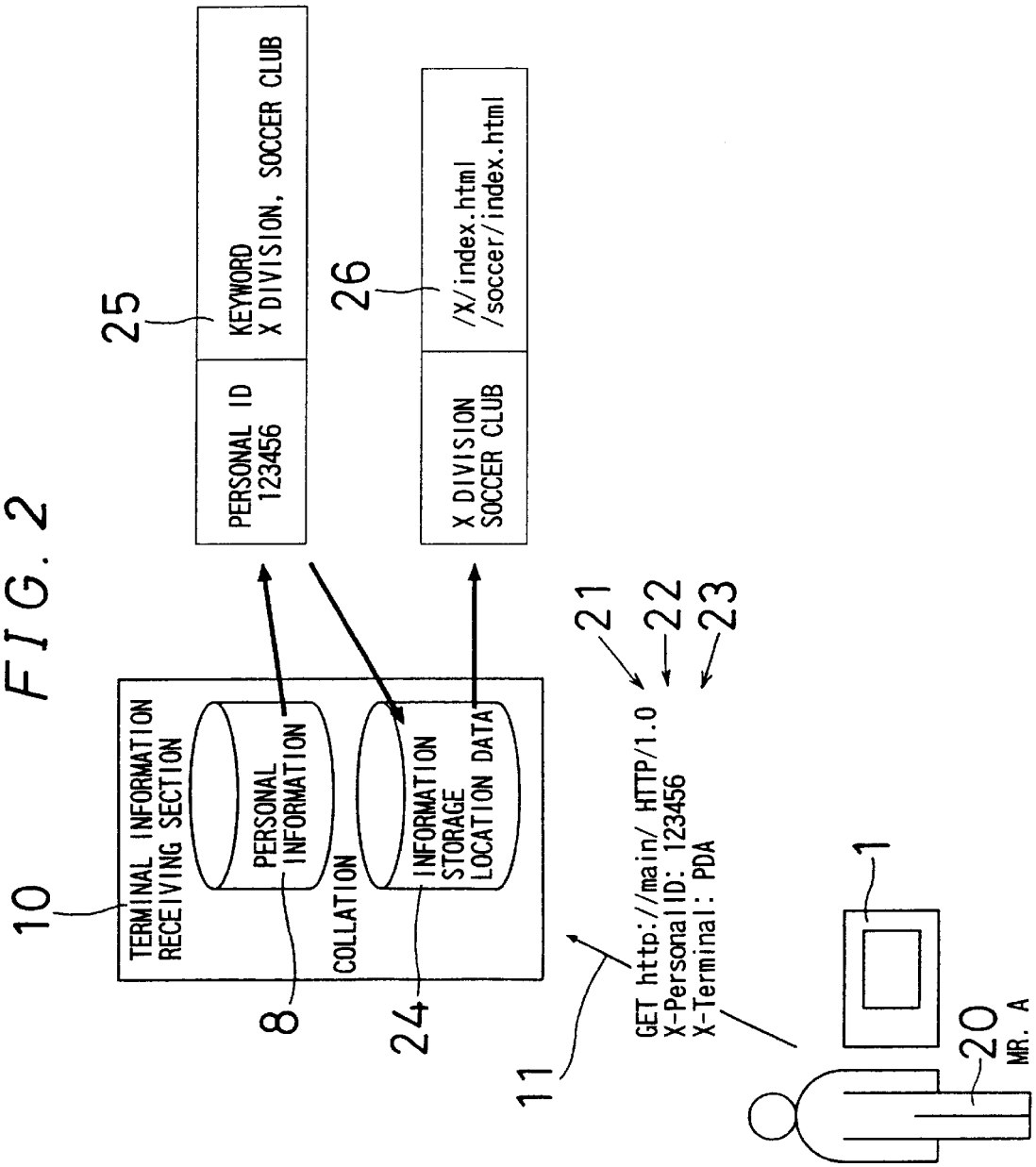
FIG. 2 is a diagram showing a state where a request for information access is made from a terminal 1 belonging to a certain person to the information transmission apparatus 10 of FIG. 1.

FIG. 2 schematically shows the state in which information such as terminal information for an information access request is sent from the terminal 1 belonging to a certain person to the information transmission apparatus 10. When the person A, who is the user 20 of the terminal 1, attempts to obtain information, firstly, together with the address 21 specifying the information transmission apparatus 10 which becomes the server, the personal ID 22 which is personal information identifying the person, and the terminal information 23 indicating the type of the terminal 1 are sent via the computer network 11. The information transmission apparatus 10 specified by the address 21 receives the personal ID 22 and the terminal information 23 as a character string and uses the personal ID 22 as a key for collecting suitable information relating to the user 20, while using the terminal information 23 for manipulating the collected information so as to be easily viewed by the terminal 1. The interpreting of the information ID 22 is performed in the terminal information receiving section An explanation will now be given of when HTTP (Hyper Text Transfer Protocol) is used as the protocol for providing information. As is the case with the ID 22 and the like, the information of the user 20 to whom the terminal 1 belongs and the terminal information 23 indicating the capabilities of the terminal 1 serve as the terminal information necessary for the provision of information. It is necessary to send requests for information access to the information transmission apparatus 10 operating as the server when using HTTP to receive information from the information transmission apparatus 10 operating as the server. When these requests for information access are sent, the terminal information is also sent.

The terminal information receiving section 3 within the information transmission apparatus 10 contains the personal information 8 and information storage location data 24 as the database, and the terminal information receiving section 3 is further provided with an HTTP server on which terminal information such as programs using CGI is accepted and a header field under requesting is interpreted, and thus a program for extracting the terminal information operates. This program compares the extracted terminal information with the personal information 8 accumulated in the personal information collating section 4, and extracts information 25 relevant to the user 20 who is reading the information. On the basis of the information 25, additional information 26 can be obtained by referring to the information storage location data 24. Note that, in the additional information 26, the information storage location is indicated by a file name such as "/x/index.html" or "/soccer/index.html". Information to be sent is edited on the basis of the extracted information 25 and 26. The information to be edited is collected in the information server section 5 as information to be sent to the user. In the information editing section 6, the collected information is edited by making a choice in accordance with the terminal information and the personal information.

Figure 3:
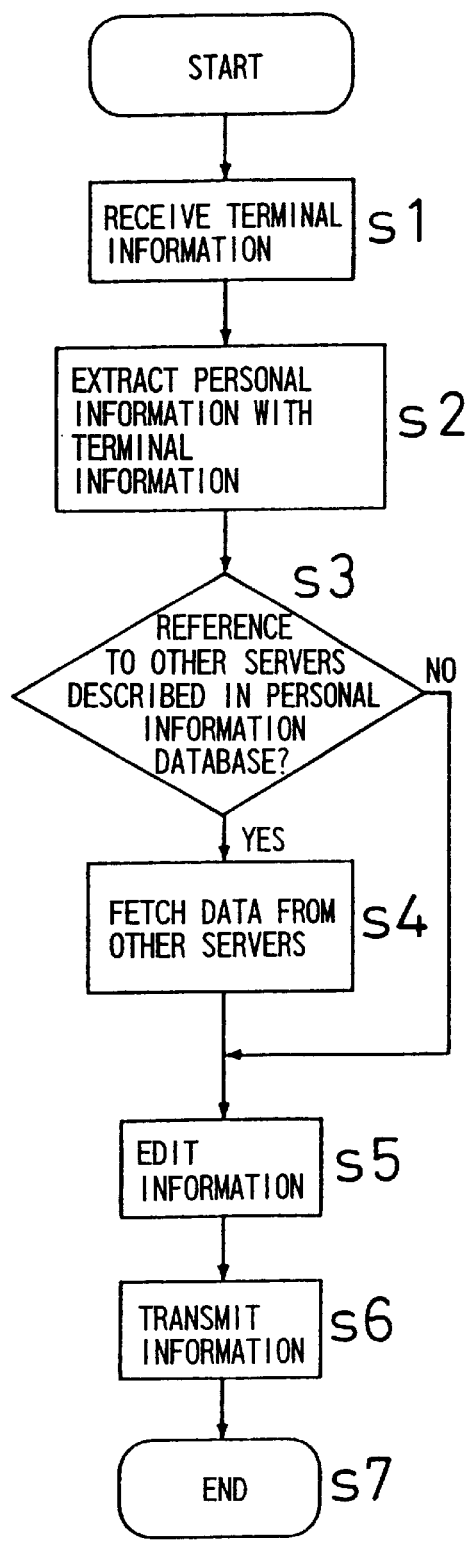
FIG. 3 is a flow chart showing an information processing routine of the information transmission apparatus 10 of FIG. 1.

FIG. 3 shows the information processing routine of the information transmission apparatus 10 of the embodiment of FIG. 1. In step s1, a request to the address 21 indicating the top page of the information transmission apparatus 10 serving as the main server is received, the request containing the personal ID22 and the terminal information 23 including the type of terminal shown in FIG. 2. In step s2, the personal information collating section 4 deduces relevant keywords from the personal information 8 accumulated as the database, using the personal ID22 of the request received by the terminal information receiving section 3 as a key. As the relevant keywords, a combination of keywords of information to be collected such as the personal belonging, age, or hobbies may be used. After the relevant keywords have been fetched, the information storage location is deduced from the information storage location data 24 included in the database of the personal information 8 using the fetched keywords as a key. In step s3, a determination is made as to whether or not the information storage location contains references to other information server sections. If references are included to other information server sections, then in step s4, data is acquired from other information server sections which are connected via the network, as is described below. If a determination is made in step s3 that no references to other information server sections are included, or if the data acquisition from the other information server sections of step s4 is completed, the routine proceeds to step s5.

In step s5, the information sever section 5 edits contents representing the information to be sent on the basis of the terminal information 23 received by the terminal information receiving section 3, and the personal information extracted by the personal information collating section 4. The editing dependent on the personal information may include changing the size of the display in accordance with the order of appearance of the keywords of the personal information. In step s6, the information edited as contents is sent to the user 20, and the information processing routine is completed.

Figures 4, 5:
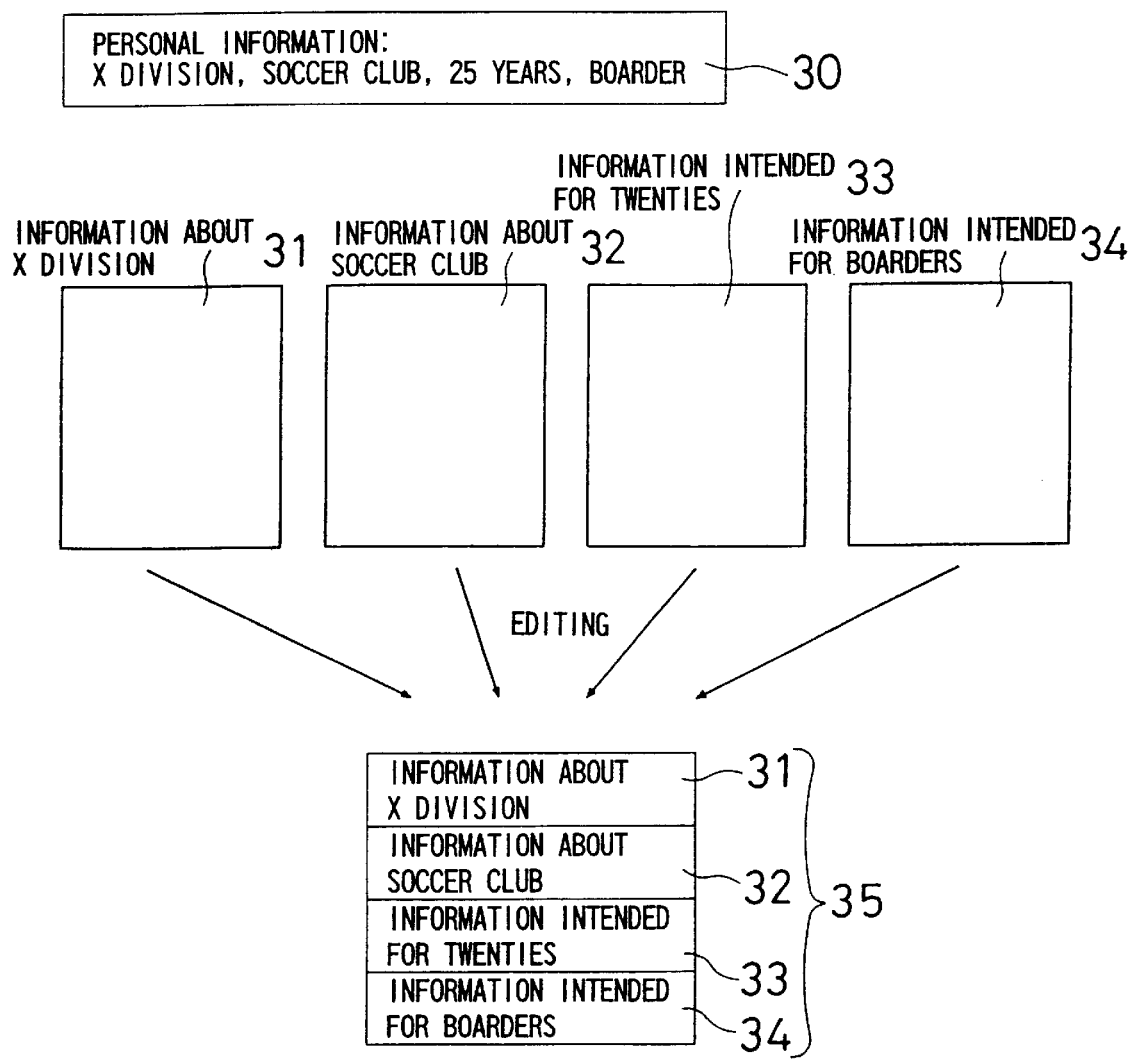
FIG. 4 is a diagram showing an example of the relationship between a personal ID 22 and a keyword 27 shown in FIG. 2.
FIG. 5 is a diagram showing an example of editing in step s5 of FIG. 2.

FIG. 4 shows an example of the relationship between the personal ID22 and the keyword 27. FIG. 5 shows editing state in which the size of the display is changed in accordance with the order of appearance of the personal information keywords. Namely, in accordance with personal information 30 which corresponds to the personal ID "123456" in FIG. 4, information 31 on X division, information 32 on a soccer club, information 33 aimed at people in their twenties, and information 34 aimed at boarders are each extracted and edited as contents 35 to be sent. Important information is displayed in a large size, while not very important information is only displayed in digest form.

FIG. 6 shows another example where editing is performed using the terminal information 23. Because it is possible to find out about the terminal 1 of the user 20 who is receiving the information from the information terminal 23, the information to be provided is altered to a layout easily read by the terminal 1. For example, because a portable terminal has a only small screen and a small storage capacity, the amount of information that can be received and displayed at one time is limited. Accordingly, it is necessary to edit the information so that only important portions of the information are selected, and transmit these portions in such a way that they are shown as news for portable terminals 36. As for news for personal computers 37 intended for personal computers and the like, the collected information is sent. In other words, the amount of information sent to a portable terminal needs to be reduced in comparison to the amount of information sent to a personal computer.

In this embodiment, information is sent to the terminal 1 sending the information access request as contents optimized for the person and the terminal apparatus in accordance with the personal ID 22 and the terminal information 23. Therefore, the person reading the information is able to obtain necessary and sufficient the information according to his or her requirements. Because there is no need to send unnecessary information, the throng to the network resources can be relieved.

FIG. 7 shows the principle of reflecting the reading history of the information reader, namely, the user 20, to the user information. "Reflecting" is, for example, to extract a keyword 40 included in the contents of the information accessed by the information reader, and when the keyword 40 already exists in the information 25 extracted from the personal information 8 from the personal information 8 based on the personal ID 22 as in the embodiment of FIG. 1, to raise the precedence thereof, whereas when the keyword 40 does not exist, to add the keyword 40 as a new keyword. In this case, the personal information 8 is revised as information 45 by raising the precedence of "soccer club", and adding "rugby". From the subsequent access, the revised personal information 8 is used. In order to make this type of processing possible, it is necessary to extract the keyword 40 from the information accessed and collected by the information reader.

Figure 8:
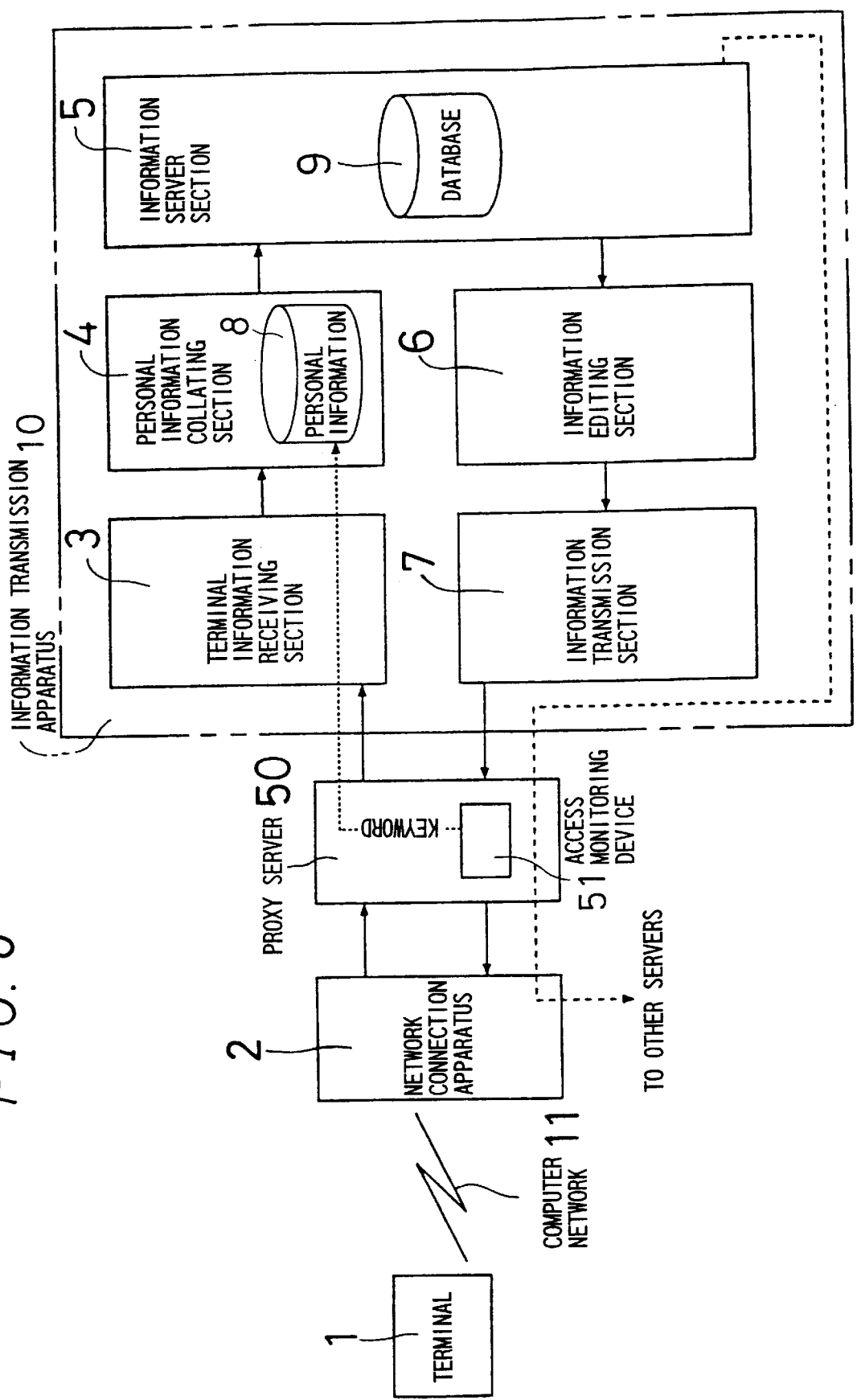
FIG. 8 is a block diagram showing the system structure of the embodiment of FIG. 7.

FIG. 8 shows an example of the system structure of the embodiment. In this embodiment, the same reference numbers are used to indicate portions corresponding to those of the embodiment of FIG. 1 and a repeated description thereof is omitted. In this embodiment, a proxy server 50 is disposed between the information transmission apparatus 10 and the network connection apparatus 2. The information reading through the information access request from the terminal 1 is set to be carried out via the proxy server 50 in any-cases. An access monitoring device 51 is disposed on the proxy server 50 which extracts the keyword 40 included in the information read by the information reader. The extracted keyword 40 is then supplied to the personal information collating section 3 inside the information transmission apparatus 10. In the personal information collating section 3, the keywords in the personal information 8 are revised in accordance with the result of the extraction by the access monitoring device 51. Because the information is collected and edited with reference to the history regarding what types of information the information reader has received in the past, similar information to those previously read can easily be acquired.

Figure 9:
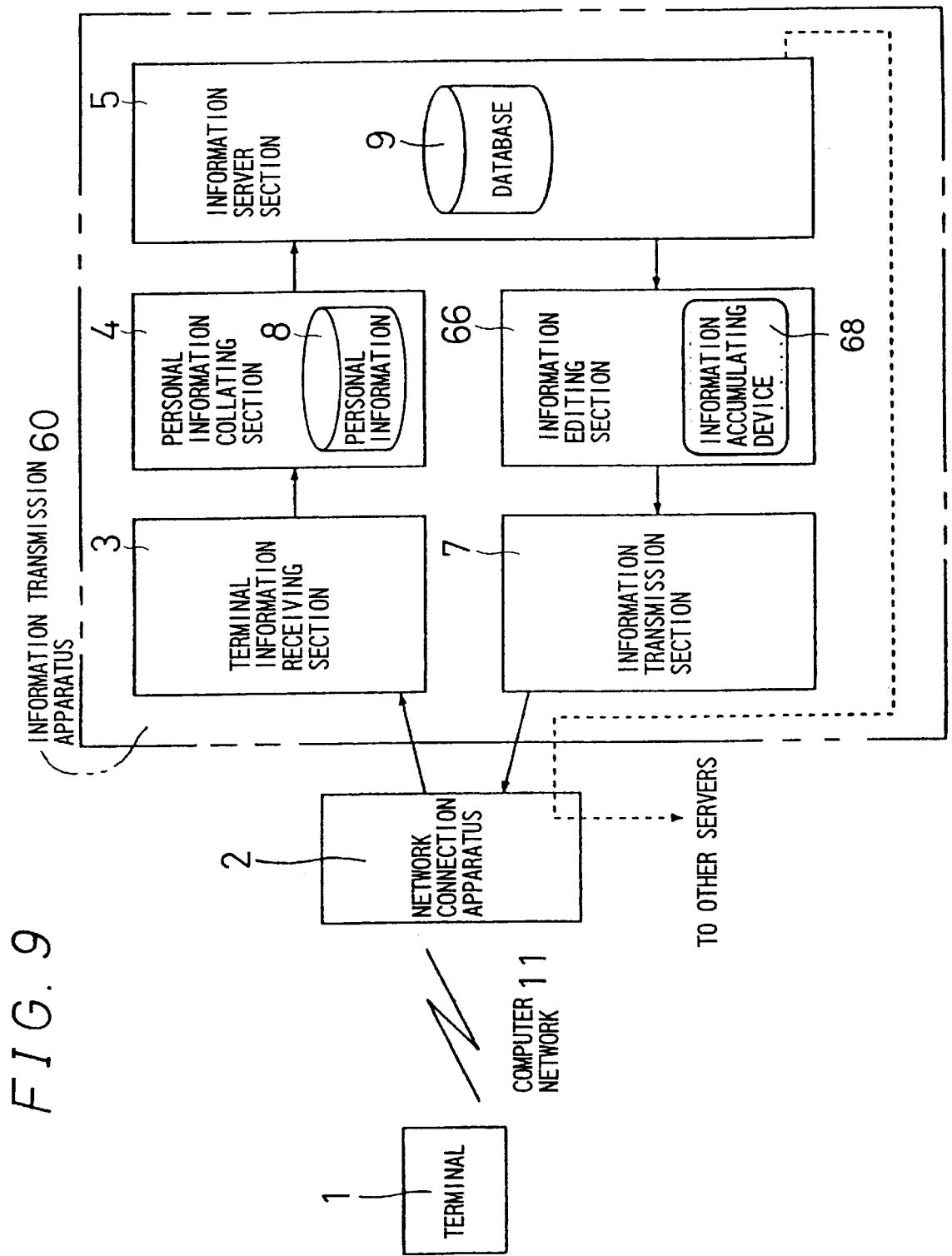
FIG. 9 is a block diagram schematically showing the system structure according to still another embodiment of the invention.

FIG. 9 schematically shows the system structure of still another embodiment of the invention. In this embodiment, the same reference numerals are used to indicate portions corresponding to those of the embodiment of FIG. 1 and a repeated description thereof is omitted. In an information transmission apparatus 60 of the embodiment, an information accumulating device 68 is added to the inside of an information editing section 66 and contents are created and stored therein in advance. When a request in the form of the information access request is received from the terminal 1 by the terminal information receiving section 3, the personal information collating section 4 searches inside the information accumulating device 68 and, if contents corresponding to the personal ID 22 have already been created, transmits those contents from the information transmission section 7.

Because contents, which have been prepared in advance are transmitted at the same time as the request arrives from the information reader, the length of time which the information reader waits can be further shortened.

FIG. 10 shows the principle of writing the storage locations of the information within other servers to the database of the personal information 8 within the main server which is the information transmission apparatuses 10, 60 in FIGS. 1, 8 and 9, according to yet still another embodiment of the invention. When HTTP is used, information 70 describing "http://dept.hogera.co.jp/x/" and "http:club.hogera.co.jp/soccer/" is used as the URL (Uniform Resource Locator) instead of the file name in the information 26 in FIG. 2 to specify the storage location of the information in the other servers. The other servers, which are sub servers in the embodiment have the same functions as the main server, namely, the functions of receiving the request, the personal ID 22, and the terminal information 23, retrieving the information, and transmitting the collected information. The main server handles the information sent from the other servers in the same way as information acquired from its own database.

According to the embodiment, at the time of transmission, there is no need to have manuscripts of all the information to be sent provided in the main server of the information transmission apparatus, therefore, the capacity of the memory in the main server can be comparatively reduced and collection of the latest information is also simplified.

Figure 11:
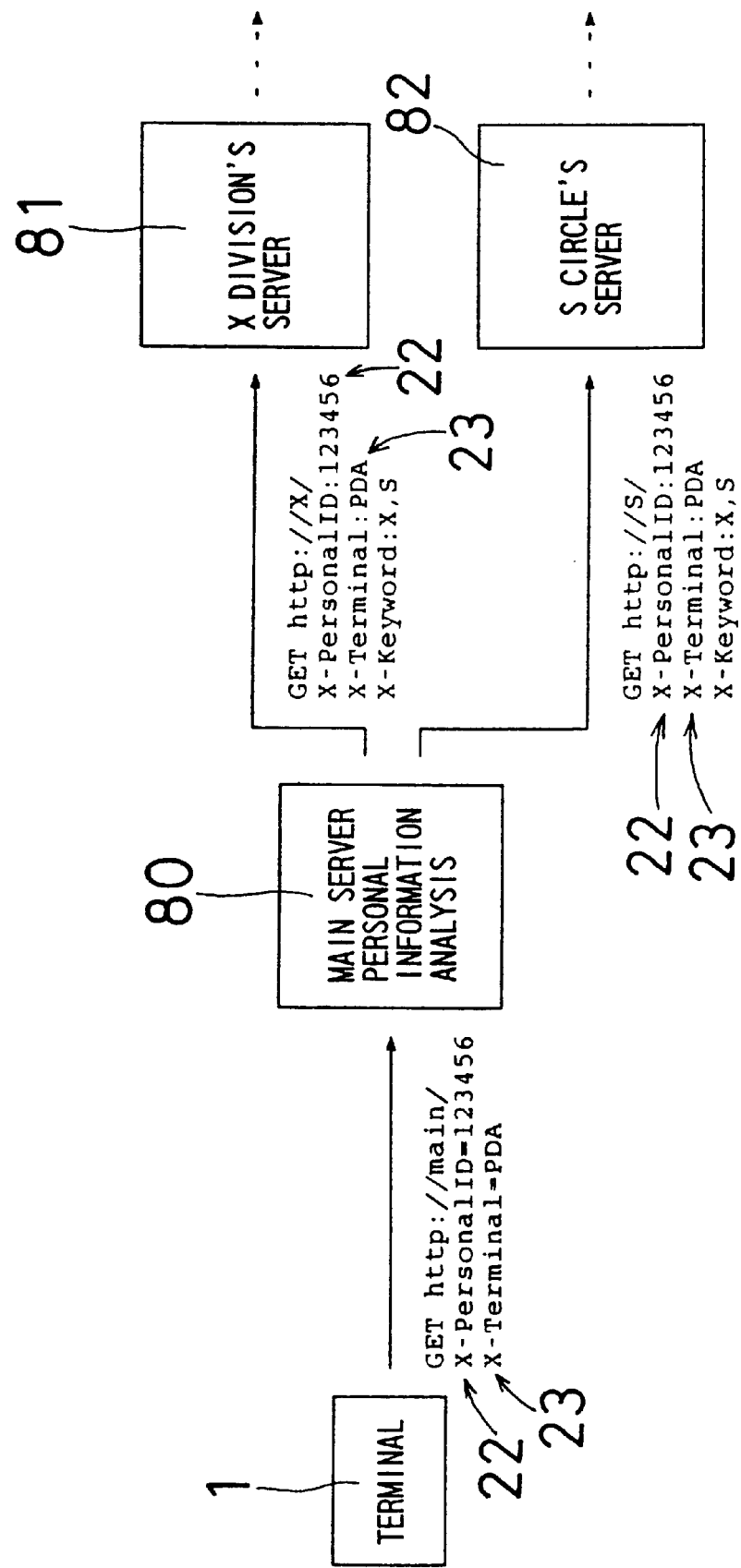
FIG. 11 is a diagram showing, as a further embodiment of the invention, a principle that a main server 80 issues a request to a lower order server as needed and collects the information.

FIG. 11 shows the principle according to a further embodiment of the invention, in which a main server 80 which is the information transmission apparatuses 10, 60 of FIGS. 1, 8 or 9 receives the request from the terminal; and the main server 80 issues a request to an x division server 81 or an S circle server 82 which is lower order server of the main server 80 as necessary, to thereby collect the information. The lower order servers 81 and 82 which are sub servers collect information in accordance with the request from the main server 80 and use the collected information as information for a response to the main server 80. Moreover, the lower order servers 81 and 82 collect information using a recursive structure by issuing requests to servers at a still lower order and are able to respond to requests from higher order servers.

The lower order servers extract personal information using the personal ID 22 in the personal information collating section 4 inside the lower order server, add the extracted information to the personal information passed down from an upper order server, and use it as information retrieval keywords. In this way, because a plurality of information servers actively collect information, the burden on the main server can be lightened. Moreover, information distribution and storage can also be easily performed.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and the range of equivalency of the claims are therefore intended to be embraced therein.

What is claimed is:

1. An information transmission apparatus for transmitting content in response to an information access request from a terminal apparatus connected via a communication network, the information transmission apparatus comprising:

a terminal information receiving section for analyzing an information access request sent from a terminal apparatus and received via a communication network and extracting terminal information in the request;

a personal information collating section accumulating personal information, for extracting personal information for a person corresponding to the terminal information received by the terminal information receiving section, from the accumulated personal information by collation with the terminal information as a key;

an information server section accumulating accessible information as a database, for fetching and collecting content corresponding to the access request from the database in accordance with the personal information extracted by the personal information collating section;

an information editing section for editing the content collected by the information server section on the basis of the personal information extracted by the personal information collating section and the terminal information received by the terminal information receiving section such that the information editing section edits the content collected by the information server section to increase a size of an important component of the content and decrease a size of an unimportant component of the content; and an information transmission section for transmitting the increased and decreased components of the information edited by the information editing section to the terminal apparatus sending the information access request.

2. The information transmission apparatus of claim 1 further comprising:

an access monitoring section for monitoring information communication from the reception of the information access request from the terminal apparatus until the transmission of the content, and storing a history of information access in the personal information collating section in relation to the terminal apparatus, wherein the personal information collating section reflects the history of information access to the extracted personal information.

3. The information transmission apparatus of claim 1, wherein the information editing section collects and edits content to be transmitted in advance before an information access request is received from the terminal apparatus, and when content conforming to the personal information extracted by the personal information collating section and the terminal information received by the terminal information receiving section is edited by the information editing section at the time of reception of the information access request, the information transmission section transmits the edited content to the terminal apparatus.

4. The information transmission apparatus of claim 1, wherein a plurality of information server sections are provided so as to be distributed over the network, and one information server section serving as a main server collects information from other information server sections serving as sub servers.

5. The information transmission apparatus of claim 4, wherein the plurality of information server sections have the same function, and each information server section serving as the sub server also can collect information from other information server sections, while regarding the other information server sections as sub servers thereof and referring to the terminal information and the personal information.

6. The information transmission apparatus of claim 1, wherein the personal information that the information editing section edits the information collected by the information server section is a type of terminal utilized by the person selected from the group consisting of a personal data assistant, a portable personal computer and a desktop personal computer.

7. The information transmission apparatus of claim 1, wherein the editing section edits the content collected by the information server section to change a size of a display of the content in accordance with the order of appearance of a keyword of the personal information.

8. The information transmission apparatus of claim 1, wherein the editing section edits the content collected by the information server section to delete unimportant components of the information.

9. The information transmission apparatus of claim 1, wherein the editing section edits the content collected by the information server section to alter a layout of the content so that the layout is easily read by the person.

10. A method for transmitting information comprising the steps of:
   a) collating personal information for a user;
   b) creating and storing content based upon the personal information prior to receiving an information access request, wherein during creation the content is edited to alter a layout of the content so that the layout is easily read by the user;
   c) receiving an information access request from the user;
   d) searching the content for data to respond to the information access request; and
   e) if the content includes the data to respond, transmitting the data to the user.

11. A method as recited in claim 10, further comprising the step of editing the data based upon the personal information.

12. A method as recited in claim 10, storing a history of information access in the personal information.

13. An information transmission apparatus for transmitting content in response to an information access request from a terminal apparatus connected via a communication network, the information transmission apparatus comprising:
   first means for analyzing an information access request sent from a terminal apparatus and received via a communication network and extracting terminal information in the request;
   second means for accumulating personal information, for extracting personal information for a person corresponding to the terminal information received by the first means, from the accumulated personal information by collation with the terminal information as a key;
   third means for accumulating accessible information as a database, for fetching and collecting information corresponding to the access request from the database in accordance with the personal information extracted by the second means;
   fourth means for editing at least a portion of the information collected by the third means on the basis of the personal information extracted by the second means and the terminal information received by the first means such that the edited portion is edited based upon a keyword of the accumulated personal information; and
   fifth means for transmitting the edited portion of the information edited by the fourth means to the terminal apparatus sending the information access request.

14. The information transmission apparatus of claim 13, wherein the first, second, third, fourth and fifth means are a server.

15. The information transmission apparatus of claim 14, wherein a plurality of information server sections are provided so as to be distributed over the network, and one information server section serving as a main server collects information from other information server sections serving as sub servers.

16. The information transmission apparatus of claim 13, further comprising:
   sixth means for monitoring information communication from the reception of the information access request from the terminal apparatus until the transmission of the information, and storing a history of information access in the second means in relation to the terminal apparatus, wherein the second means reflects the history of information access to the extracted personal information.

17. The information transmission apparatus of claim 13, wherein the fourth means collects and edits information to be transmitted in advance before an information access request is received from the terminal apparatus, and when information conforming to the personal information extracted by the second means and the terminal information received by the first means is edited by the fourth means at the time of reception of the information access request, the fifth means transmits the edited information to the terminal apparatus.

18. A method for providing content to a client in a distributed computing network in response to an access request from a terminal apparatus comprising the steps of:
   (a) receiving first data related to the terminal apparatus, wherein the first data includes a viewing area size of the terminal apparatus;
   (b) collating second data related to a user associated with the terminal apparatus;
   (c) collecting third data from a database on an information server based upon the second data;
   (d) editing the third data based upon the first data so as to be suitable for the viewing area size; and
   (e) transmitting the edited third data to the terminal apparatus.

* * * * *